(12) United States Patent
Jung et al.

(10) Patent No.: US 12,549,017 B2
(45) Date of Patent: *Feb. 10, 2026

(54) METHOD AND APPARATUS FOR CHARGING A BATTERY

(71) Applicants: Samsung Electronics Co., Ltd., Gyeonggi-do (KR); Fairchild Korea Semiconductor Ltd., Gyeonggi-do (KR)

(72) Inventors: Ku-Chul Jung, Seoul (KR); Erik Wilson Maier, Scarborough, ME (US); Oscar Freitas, Cumberland, ME (US); Kisun Lee, Gyeonggi-do (KR); Chul-Eun Yun, Gyeonggi-do (KR); Kwang-Sub Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 970 days.

This patent is subject to a terminal disclaimer.

(21) Appl. No.: 17/396,995

(22) Filed: Aug. 9, 2021

(65) Prior Publication Data

US 2021/0367434 A1 Nov. 25, 2021

Related U.S. Application Data

(63) Continuation of application No. 16/194,711, filed on Nov. 19, 2018, now Pat. No. 11,121,559, which is a (Continued)

(30) Foreign Application Priority Data

Dec. 23, 2013 (KR) ........................ 10-2013-0161661

(51) Int. Cl.
*H02J 7/00* (2006.01)
*H01M 10/42* (2006.01)

(52) U.S. Cl.
CPC ........ *H02J 7/00036* (2020.01); *H02J 7/0071* (2020.01); *H01M 10/4257* (2013.01);
(Continued)

(58) Field of Classification Search
CPC ..... H02J 7/0004; H02J 7/00036; H02J 7/0071
(Continued)

(56) References Cited

U.S. PATENT DOCUMENTS 7,159,132 B2 * 1/2007 Takahashi ............... G06F 1/266
713/300
7,447,922 B1 * 11/2008 Asbury ............... G06F 13/4282
713/300
(Continued)

FOREIGN PATENT DOCUMENTS

JP 2003-263245 A 9/2003
JP 2011-205839 A 10/2011
(Continued)

*Primary Examiner* — Richard V Muralidar
(74) *Attorney, Agent, or Firm* — Cha & Reiter, LLC.

(57) ABSTRACT

A method is provided comprising: detecting a connection between an electronic device and a battery charger; transmitting to the battery charger a first request for at least one of a first voltage level and a first current level; receiving from the battery charger a signal; and charging a battery of the electronic device with the signal.

20 Claims, 11 Drawing Sheets

Related U.S. Application Data continuation of application No. 14/576,402, filed on Dec. 19, 2014, now Pat. No. 10,135,263.

(52) U.S. Cl.
CPC ........ *H01M 2010/4278* (2013.01); *H02J 7/00* (2013.01); *H02J 7/00034* (2020.01); *H02J 7/00045* (2020.01); *H02J 2207/30* (2020.01); *H02J 2207/40* (2020.01)

(58) Field of Classification Search
USPC .......................................................... 320/106
See application file for complete search history.

(56) References Cited

U.S. PATENT DOCUMENTS

| | | | |
|---|---|---|---|
| 7,612,527 B2 * | 11/2009 | Hoffman | H02J 7/005 |
| | | | 320/107 |
| 10,135,263 B2 * | 11/2018 | Jung | H02J 7/00047 |
| 10,658,859 B2 | 5/2020 | Smith et al. | |
| 11,121,559 B2 * | 9/2021 | Jung | H02J 7/00047 |
| 2010/0272102 A1 | 10/2010 | Kobayashi | |
| 2013/0088196 A1 | 4/2013 | Chen et al. | |
| 2013/0207455 A1 | 8/2013 | Doljack | |
| 2013/0305066 A1 | 11/2013 | Mullins et al. | |

FOREIGN PATENT DOCUMENTS

| | | |
|---|---|---|
| KR | 20-0157921 Y1 | 10/1999 |
| KR | 10-2007-0092398 A | 9/2007 |
| KR | 10-2013-0002970 A | 1/2013 |

\* cited by examiner

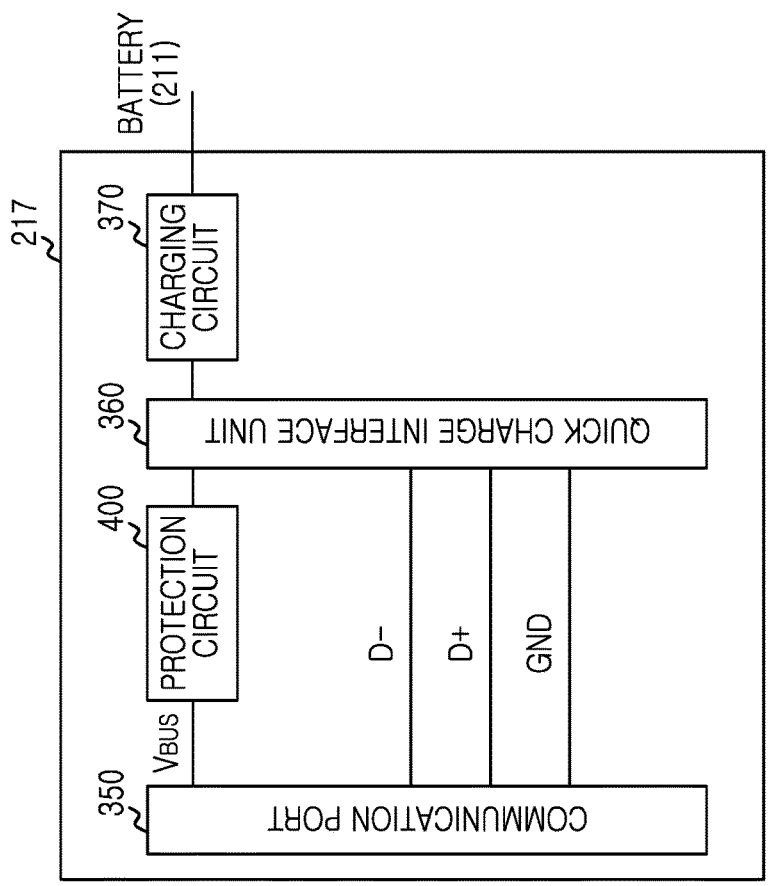
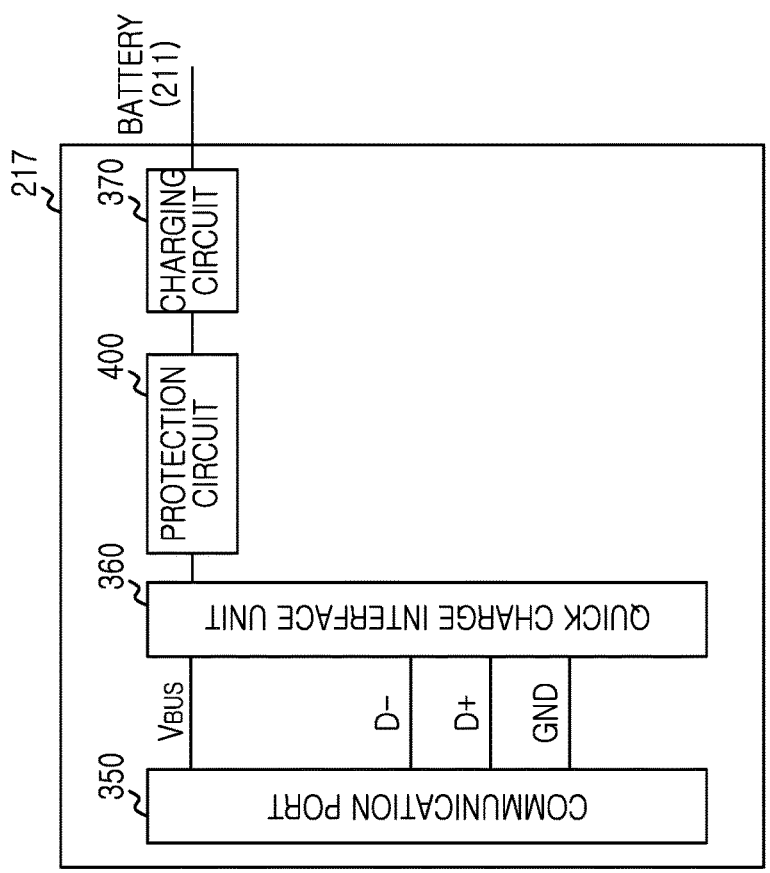
FIG.4A
FIG.4B

METHOD AND APPARATUS FOR CHARGING A BATTERY

CLAIM OF PRIORITY

This application is a Continuation of U.S. patent application Ser. No. 16/194,711 filed on Nov. 19, 2018 which is a Continuation of U.S. patent application Ser. No. 14/576,402 filed Dec. 19, 2014, U.S. Pat. No. 10,135,263 issued on Nov. 20, 2018, which claims the benefit under 35 U.S.C. § 119(a) of a Korean patent application filed in the Korean Intellectual Property Office on Dec. 23, 2013 and assigned Serial No. 10-2013-0161661, the entire disclosure of which is hereby incorporated by reference.

TECHNICAL FIELD

The present disclosure is related to electronic devices, and more particularly to a method and apparatus for charging a battery.

BACKGROUND

With the development of electronics communication industries in recent years, an electronic device such as a cellular phone, an electronics organizer, a Personal Digital Assistant (PDA), or the like, has become necessities of modern life as an important means for delivering information which changes rapidly.

There is a growing user's demand for the electronic device as the electronic device is popularized. The electronic device uses a battery as a power source, and a battery consumption amount is increased since the introduction of a smart electronic device causes an increase in the use of the Internet, applications, or the like, a display size is increased, and a Central Processing Unit (CPU) is improved in its resolution and performance. A high capacity battery is produced to cope with such a situation, and there is a growing interest on a quick charge of the high capacity battery.

At present, lithium-ion batteries are charged on the basis of a Constant Current (CC)-Constant Voltage (CV) charging scheme. However, this scheme may have several drawbacks. For example, using this scheme may require the use of high capacity charges when a quick charge is desired. This in turn could lead to increased power losses due to heat and unstable voltage levels. For example, when a Travel Adapter (TA) is used as a power input device, high rated current is required to acquire a high rated capacity as the standard TA uses a 5V as a standard fixed voltage. High rated current could lead to increased power losses and also to a reduced input power for charging the electronic device.

Accordingly, a need exists for new techniques for charging electronic devices.

SUMMARY

According to one aspect of the disclosure, a method is provided comprising: detecting a connection between an electronic device and a battery charger; transmitting to the battery charger a first request for at least one of a first voltage level and a first current level; receiving from the battery charger a signal; and charging a battery of the electronic device with the signal.

According to another aspect of the disclosure, a method is provided comprising: detecting a connection between an electronic device and a battery charger; receiving from the electronic device a first request for a first signal characteristic; detecting whether the battery charger is capable of outputting a signal having the first signal characteristic; and in response to detecting that the battery charger is capable of outputting the signal having the first signal characteristic, outputting the signal to the electronic device.

According to yet another aspect of the disclosure, an electronic device is provided comprising a processing circuitry configured to: detect a connection with a battery charger; transmit to the battery charger a first request for at least one of a first voltage level and a first current level; receive from the battery charger a signal; and charge a battery with the signal.

According to yet another aspect of the disclosure, a battery charger is provided comprising processing circuitry configured to: detect a connection with an electronic device; receive from the electronic device a first request for a first signal characteristic; detect whether the battery charger is capable of outputting a signal having the first signal characteristic; and in response to detecting that the battery charger is capable of outputting the signal having the first signal characteristic, output the signal to the electronic device.

According to yet another aspect the disclosure, a charging method of an electronic device is provided. The method includes confirming whether a power supplier is connected, if the power supplier is connected, negotiating a voltage-current pair corresponding to a rated power by using a quick charge interface, and starting charging by using the negotiated voltage-current pair.

According to yet another aspect of the disclosure, a charging method of a power supplier is provided. The method includes detecting whether an electronic device is inserted, if the electronic device is inserted, negotiating a voltage-current pair corresponding to a rated power by using a quick charge interface, and supplying the negotiated voltage-current pair to the electronic device.

According to yet another aspect of the disclosure, a charging apparatus of an electronic device is provided. The apparatus includes a Universal Serial Bus (USB) controller configured for confirming whether a power supplier is connected, if the power supplier is connected, negotiating a voltage-current pair corresponding to a rated power by using a quick charge interface, and starting charging by using the negotiated voltage-current pair.

According to yet another aspect of the disclosure, a charging apparatus of a power supplier is provided. The apparatus includes a USB controller configured for detecting whether an electronic device is inserted, if the electronic device is inserted, negotiating a voltage-current pair corresponding to a rated power by using a quick charge interface, and supplying the negotiated voltage-current pair to the electronic device.

BRIEF DESCRIPTION OF THE DRAWINGS

The above and other aspects, features and advantages of certain aspects of the disclosure will be more apparent from the following detailed description taken in conjunction with the accompanying drawings, in which:

FIG. 4A and FIG. 4B illustrate different examples of integrating a protection circuit in the charging circuit of FIG. 2, according to aspects of the disclosure;

DETAILED DESCRIPTION

Figure 1A:
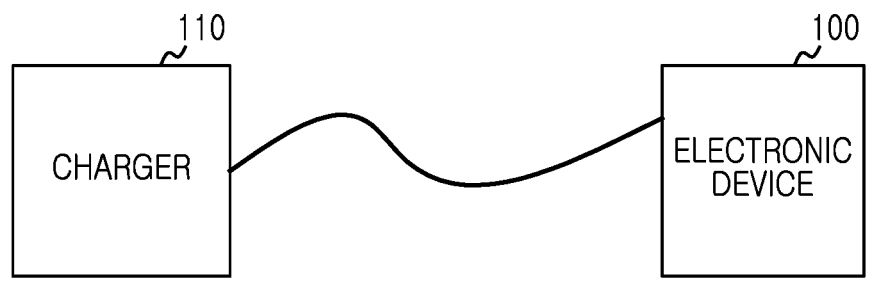
FIG. 1A is a schematic diagram of an example of a system, according to aspects of the disclosure.

FIG. 1A is a schematic diagram of an example of a system, according to aspects of the disclosure. In this example, an electronic device 100 may be connected to a charger 110 via a USB cable. The charger 110 may be any suitable type of charger, such as the Travel Adapter (TA). The electronic device 100 may include a USB socket (not shown) that is physically connected, via a USB cable, to another USB socket on the charger 110. Although in this example, the charger 110 includes a USB socket, in other examples the USB cable can be directly soldered to the charger 110 thereby bypassing the need for a USB socket. In operation, upon receiving an Alternating Current (AC) signal (e.g., 220V or 110V) from a wall outlet, the charger 110 may convert the received AC signal into a Direct Current (DC) signal and feed the DC signal to the electronic device 100.

Figure 1B:
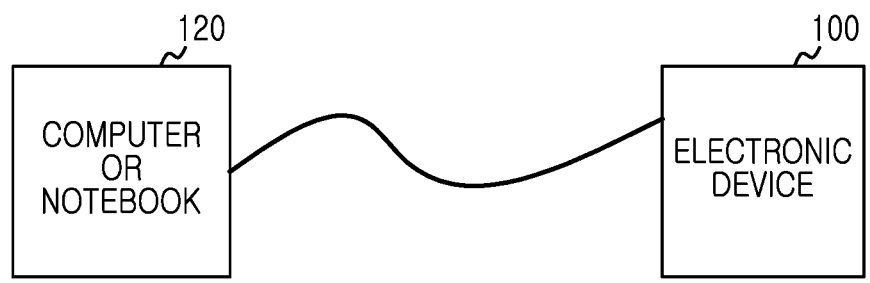
FIG. 1B is a schematic diagram of another example of a system, according to aspects of the disclosure.

FIG. 1B is a schematic diagram of another example of a system, according to aspects of the disclosure. In this example, the electronic device 100 is connected to a computer 120. When an AC signal is input to the computer 120, a Switching Mode Power Supply (SMPS, not shown) that is part of the computer 120 converts the AC signal to DC signal. The DC signal may then be fed to the electronic device via a USB port and/or any other suitable type of interface.

In some implementations, the charger 110 or the computer 120 may support a battery charger communication protocol. The battery charger communication protocol may be used to negotiate a voltage and/or current levels between the charger 110 (or the computer 120) and electronic device 100.

Figure 2:
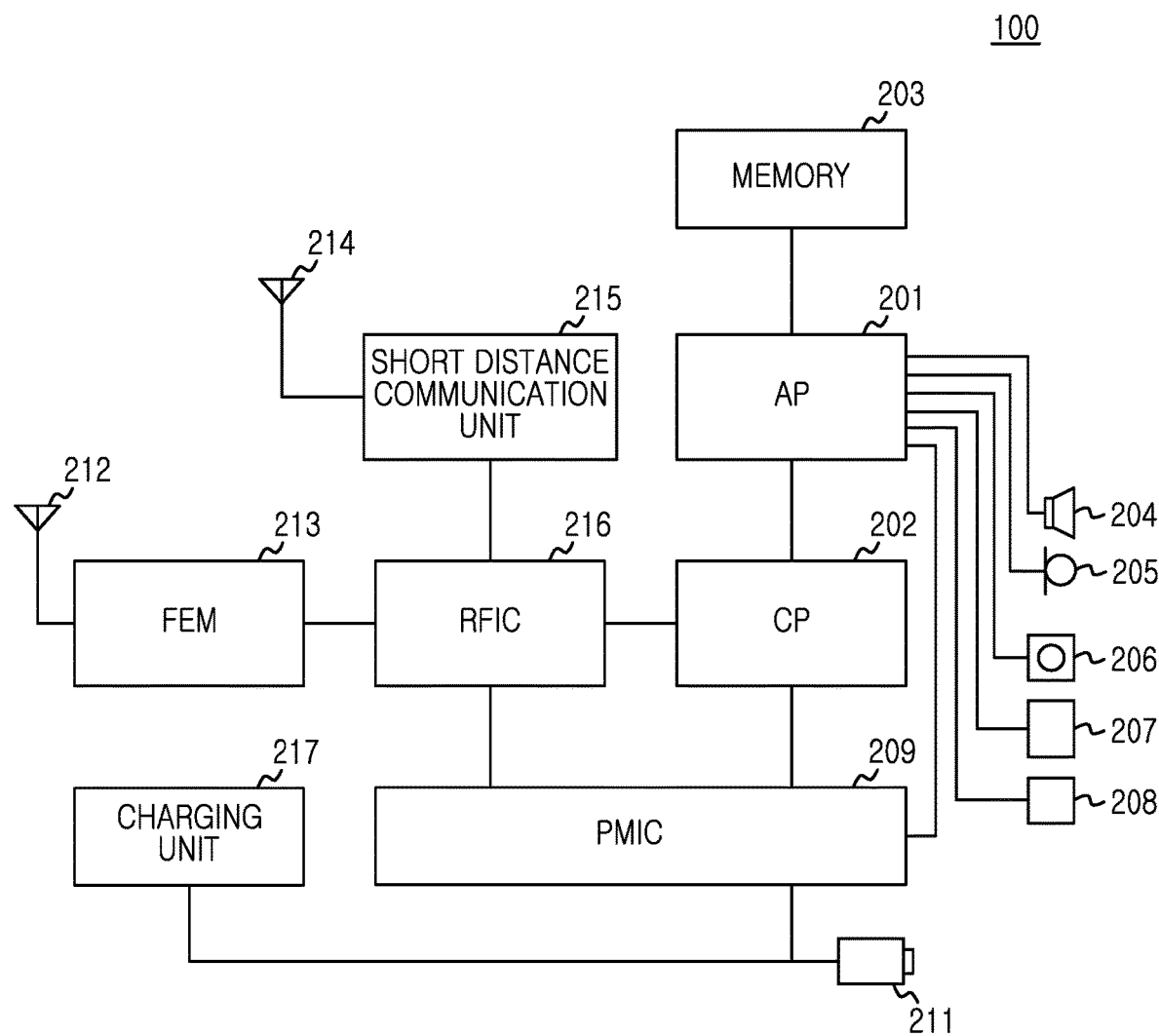
FIG. 2 is a block diagram of an example of the electronic device, according to aspects of the disclosure.

FIG. 2 is a block diagram of an example of the electronic device 100, according to aspects of the disclosure. According to this example, the electronic device 100 may include at least one of a smart phone, a tablet Personal Computer (PC), a mobile phone, a video phone, an e-book reader, a Personal Digital Assistant (PDA), a Portable Multimedia Player (PMP), a MPEG-1 Audio Layer 3 (MP3) player, a mobile medical device, a camera, and a wearable device (e.g., a Head-Mounted-Device (HMD) such as electronic glasses, electronic clothes, an electronic bracelet, an electronic necklace, an electronic appcessory, an electronic tattoo, or a smart watch).

The electronic device 100 may include an Application Processor (AP) 201, a Communication Processor (CP) 202, a memory 203, a speaker 204, a microphone 205, a camera 206, a display 207, a touch panel 208, a Power Manager Integrated Circuit (PMIC) 209, a battery 211, a cellular antenna 212, a Front End Module (FEM) 213, a Wireless Connectivity (WC) antenna 214, a short distance communication unit 215, a Radio Frequency Integrated Circuit (RFIC) 216, and a charging unit 217.

The AP 210 may include any suitable type of processing circuitry, such as a general purpose processor (e.g., an ARM-based processor, an x86-based processor, a MIPS-based processor, etc.), a Field-Programmable Gate Array (FPGA), and an Application-Specific Integrated Circuit (ASIC). In some implementations, the AP 201 may support an arithmetic processing function, a content reproduction function of various formats (e.g., an audio, image, video, or the like), a graphic engine, or the like. The AP 201 may execute an Operating System (OS), various functions, or the like. In some implementations, the AP 201 may be constructed with one chip on which a great number of components. The component may include a logic core, a memory, a display system/controller, a multimedia encoding/decoding codec, a 2D/3D accelerator engine, an Image Signal Processor (ISP), a camera, an audio modem, a variety of high & low speed serial/parallel connectivity interfaces, or the like. In some implementations, the AP 201 may be implemented as a System-On-Chip (SOC).

The CP 202 enables voice communication and/or data communication, and may compress voice data and image data or may decompress the compressed data. The CP 202 may include a baseband modem, a Baseband Processor (BP), or the like. The CP 202 may be designed to operate by using one of a Global System for Mobile Communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a Wireless Fidelity (Wi-Fi) network, a WiMax network, and a Bluetooth network.

Although not shown, the electronic device 100 may include a graphic processor or an audio processor. The graphic processor may perform image information processing, acceleration, signal conversion, screen output, or the like. The audio processor may perform any suitable type of audio processing.

The memory 203 may include any suitable type of volatile and/or non-volatile memory. In some implementations, the memory 203 may store processor executable instructions implementing, at least in part, the process discussed with respect to FIG. 10.

The speaker 204 may convert an electric signal into a sound of an audible frequency band and then may output the converted signal. The microphone 205 may convert a sound wave delivered from human or other sound sources into an electric signal.

The camera 206 may convert a light beam reflected from a subject of photography into an electric signal. The camera 206 may include a Charged Coupled Device (CCD), a Complementary Metal-Oxide Semiconductor (CMOS), or the like.

The display 207 may output an electric signal as visual information (e.g., text, graphic, video, or the like). The display 207 may be one of an Electro Wetting Display (EWD), an E-Paper, a Plasma Display Panel (PDP), a Liquid Crystal Display (LCD), an Organic Light Emitting Diode (OLED), and an Active Matrix Organic Light Emitting Diodes (AMOLED).

The touch panel 208 may receive a touch input. The touch panel may be one of a digitizer for a stylus pen, a capacitive overlap touch panel, a resistance overlap touch panel, a surface acoustic wave touch panel, and an infrared beam touch panel.

The PMIC 209 may regulate a power from the battery 211. For example, the AP 201 may transmit information to the PMIC 209 with a load to be processed. The PMIC 209 may regulate a core voltage to be supplied to the AP 201 by using the information provided from the AP 201.

The FEM 213 may be a transmission/reception device capable of controlling a radio signal. The FEM 213 may connect the cellular antenna 212 and the RFIC 216, and may separate a transmission/reception signal. The FEM 213 may take a role of filtering and amplification, and may include a receiving-side front end module including a filter for filtering a reception signal and a transmitting-side front end module including a Power Amplifier Module (PAM) for amplifying a transmission signal.

The short distance communication unit 215 may be implemented by including various communication functions not processed by the processors 201 and 202, for example, WiFi, Bluetooth, Near Field Communication (NFC), Universal Serial Bus (USB), or Global Positioning System (GPS).

The RFIC (e.g., RF transceiver) 216 may receive a radio frequency from a base station, and may modulate a received high frequency band into a low frequency band (i.e., a baseband) that may be processed in a module (e.g., the CP 202).

The charging unit 217 may charge the battery 211. In some implementations, the charging unit 217 may generate a signal for charging the battery 211. In some implementations, the charging unit 217 may regulate (or otherwise adjust) voltage or current that is fed to the battery. Additionally or alternatively, the charging unit 217 may perform a constant current charging operation and a constant voltage charging operation. The charging unit 217 may include an external port that can be electrically connected to an external device, e.g., a TA (travel adapter) or a computer. The charging unit 217 is discussed further below with respect to FIG. 3.

The external port may be a USB port having a quick charge interface function.

The quick charge interface operates via USB ports and a cable in general, and may be limited to a standard-A USB port of a TA connected to a micro-B or micro-AB USB socket (i.e., receptacle). In addition, a USB charger may be a device having a Dedicated Charging Port (DCP) in general.

When the DCP is detected, quick charge detection is complete. If it is determined that a quick charge communication link is possible, communication for the quick charge may start. If the communication link is disconnected at any time, ports at both sides may be restored to their default values.

The quick charge interface may be constructed of a physical layer which allows bytes to be delivered in both directions through a D-pin. A multi-byte may be transmitted or received by using the physical layer. A parity may ensure an error detection in traffic.

In various exemplary embodiments of the present disclosure, a device of transmitting traffic may be called a master which is an electronic device to be charged in general, and a device of receiving traffic is generally called a slave which is a TA in general.

The quick charge protocol layer has one byte defined for a voltage and current transmitted from a master device. If a special voltage and current can be delivered, a slave TA returns the same byte in response. If the special voltage and current cannot be delivered, all possible voltage-current sets of the TA may be transmitted so that the electronic device can select a suitable voltage and current.

Figure 3:
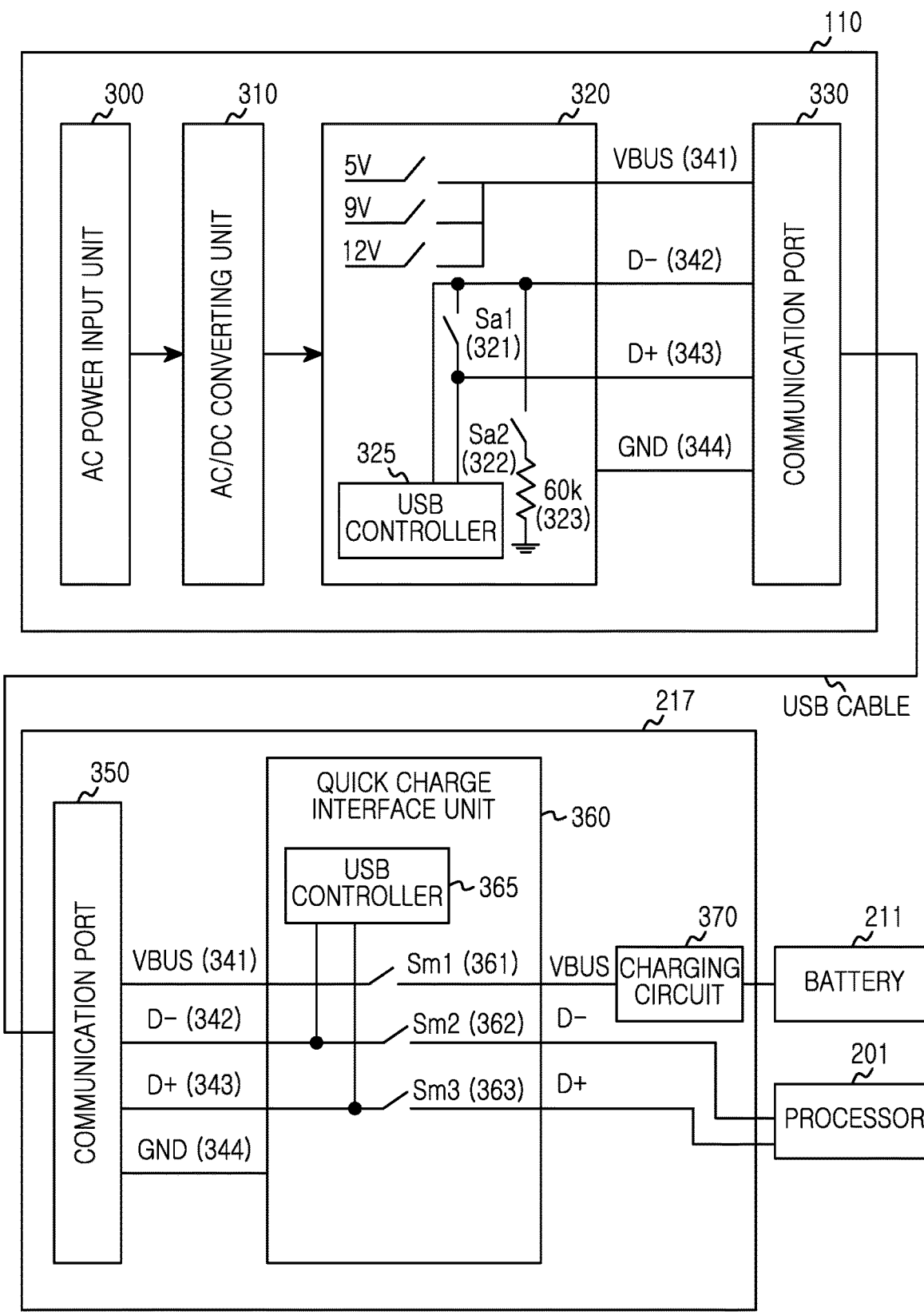
FIG. 3 is a diagram illustrating an example of a connection between an electronic device charging unit and a charging device.

FIG. 3 is a diagram illustrating an example of a connection between the charging unit 217 and a charging device, according to aspects of the disclosure. In this example, the charging device includes the charger 110, but in other implementations, the charging device may include the computer 120 and/or any other suitable type of battery charger.

As illustrated, the charger 110 may include an AC power input unit 300, an AC/DC converting unit 310, a quick charge interface unit 320, and a communication port 330. In operation, the input unit 300 may receive an AC signal from a power outlet and feed the AC signal to the AC/DC converting unit 310. The AC/DC converting unit 310 may convert the AC signal to a DC signal. The AC/DC converting unit 310 may then feed the DC signal to the quick charge interface unit 320.

In some implementations, a characteristic of the DC signal may be determined as a result of a communication that is executed between the charger 110 and the electronic device 100. The characteristic may include voltage, current level, and/or any other suitable type of characteristic.

In some implementations, the electronic device 100 may select the voltage and/or current level from a predetermined set of a voltage-current pairs. For example, the set may include the following pairs: 5[V]-2.5[A], 9[V]-1.67[A], and 12[V]-1.25[A]. It is to be understood that the set is not limited to any specific voltage and/or current values. It is further to be understood that the set can include any number of voltage-current pairs.

In some implementations, the quick charge interface 320 may select one of the voltage-current pairs in the set (e.g., 5[V]-2.5[A], 9[V]-1.67[A], and 12[V]-1.25[A]) and then output an indication of the selected voltage-current pair to the charging unit 217. The indication can be transmitted via a USB interface with the charging unit 217.

The USB interface may include 4 lines: a $V_{BUS}$ line 341, a D− line 342, a D+ line 343, and a GND line 344. The USB voltage may be supplied to the electronic device 100 via the $V_{Bus}$ line 341 and the GND line 344 under the control of a USB controller 325. For example, the GND line 344 may be connected to the ground (GND) of the charging unit. The D− line 342 may be used for exchanging data between the electronic device 100 and the charger 110. The D+ line 343 may be used for transmitting a signal indicating whether the electronic device 100 and the charger 110 are connected.

In some implementations, the USB controller 325 may operate a switch Sa1 321 so that the D− line 342 and the D+ line 343 can be shorted when necessary. Additionally or alternative, the USB controller 325 may control a switch Sa2 322 to receive a ping signal for a quick charge via the D− node 342.

The charging unit 217 may include a communication port 350, a quick-charge interface unit 360, and a charging circuit 370. The communication port 350 may be a USB port and/or any other suitable type of port. The quick charge interface unit 360 may include a controller 365, and switches 361-363. In operation, the controller 360 may exchange communications with the charger 110, as discussed with respect to FIGS. 10-11. The USB controller may further control switches Sm2 362 and Sm3 363 when necessary, in order to prevent/enable the flow of data received over the D− line 342 and the D+ line 343 to the application processor 211. In addition, the controller may supply a signal received over the Vbus line 341 to the charging circuit 370. The charging circuit 370 may generate one of fixed-voltage and fixed-current signal based on the received signal and feed the generated signal to the battery 211.

According to aspects of the disclosure, in order to prevent an overvoltage or overcurrent from flowing into the charging circuit 370, a protection circuit 400 may be connected in front of the charging circuit 370. For example, the protection circuit may be an Over Voltage Protection (OVP). According to aspects of the disclosure, the OVP may be implemented with a switching capacitor. As shown in FIG. 4A, the protection circuit 400 may be situated between the quick charge interface unit and the charging circuit 370. Additionally or alternatively, as shown in FIG. 4B, the protection circuit 400 may be disposed between the communication port 350 and the quick interface circuit 360.

Figure 5:
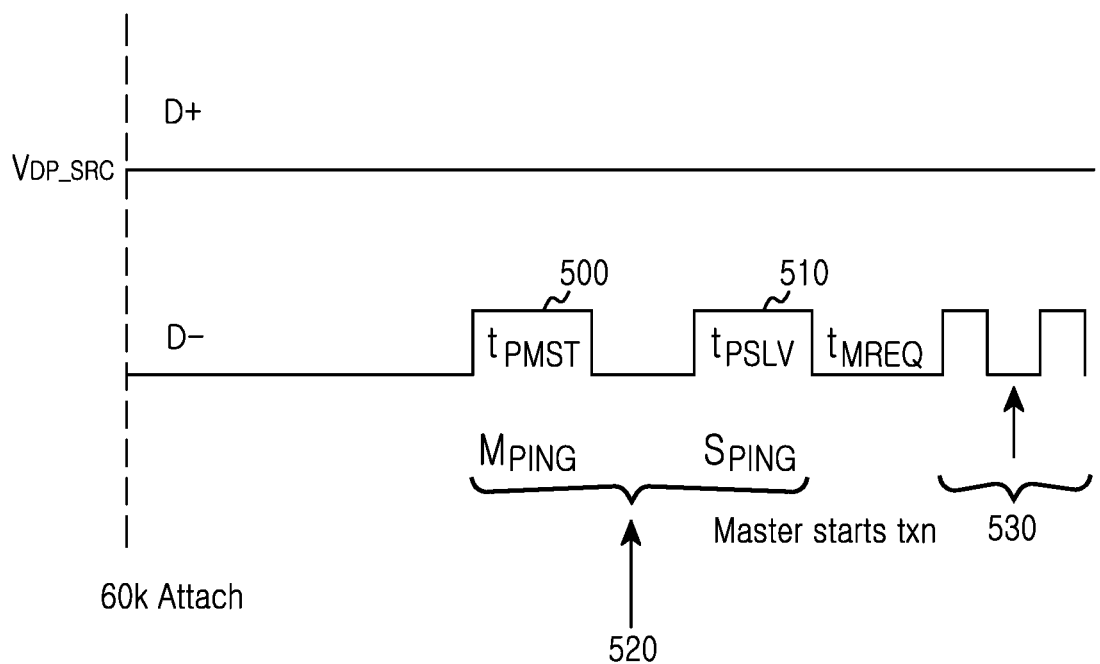
FIG. 5 is a diagram illustrating an example of a clock synchronization handshake, according to aspects of the disclosure.

FIG. 5 is a diagram illustrating an example of a clock synchronization handshake, according to aspects of the disclosure. Referring to FIG. 5, a master (e.g., the electronic device 100) may start communication via the D− line by transmitting a master ping to a slave (e.g., the charger 110). The ping may be transmitted by setting the D− line to "HIGH" for duration $t_{PMST}$ (see 500). The slave device may respond with a slave ping. The slave ping may be transmitted by setting the D− line to "HIGH" for duration $t_{PSLV}$ (see 510). In some implementations, the master may transmit 5 pings without a slave response before the entire ping sequence is re-attempted. Additionally or alternatively, in some implementations, before an error flag is raised, the ping sequence may be attempted up to 3 times. After the exchange of master and slave pings is completed, pulses 530 (which may have ¼ of the duration of the master and/or slave pings) may be used to indicate a start of a packet, an identification of byte transmission, and an end of the packet.

Although, in this example the electronic device being charged acts as a master and the charger used to charge the electronic device is a slave, in other examples, the charger may operate as a master while the electronic device is the slave. Furthermore, the handshake between the master and slave devices may include any suitable number of pings and/or number of attempts.

As a result of the above handshake, the master and slave devices may synchronize their clocks and begin an exchange of data. This may be performed using initial ping pulses which start quick charge communication.

More particularly, $t_{MREG}$ is a duration in which the master requests possession of the D− line a (which operates as a bus) when necessary after the exchange of master and slave pings is completed. After the master has gained possession of the D− line, the master may start placing data on it. The data may be transmitted in bytes followed by a parity bit.

In addition, in various exemplary embodiments, instead of the electronic device, the TA or the computer may serve as the master to start communication by transmitting a master ping including "HIGH" during $t_{PMST}$.

Figure 6A:
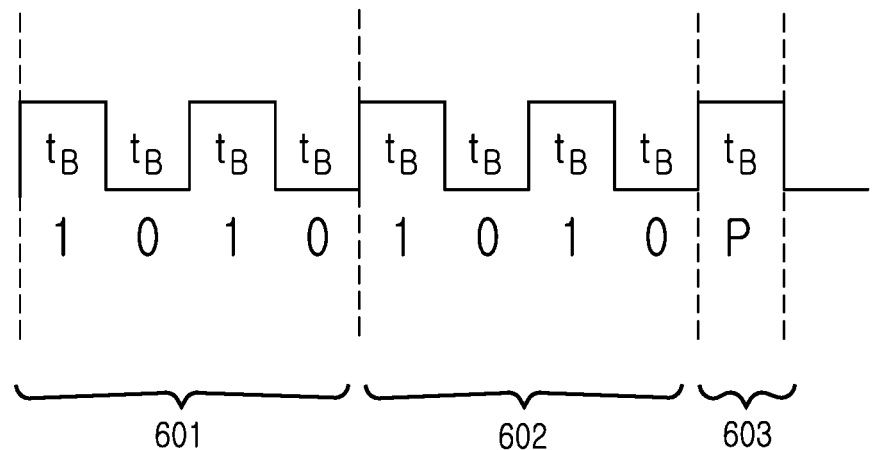
FIG. 6A and FIG. 6B are diagrams illustrating an example of a data transmission process, according to aspects of the disclosure.
Figure 6B:
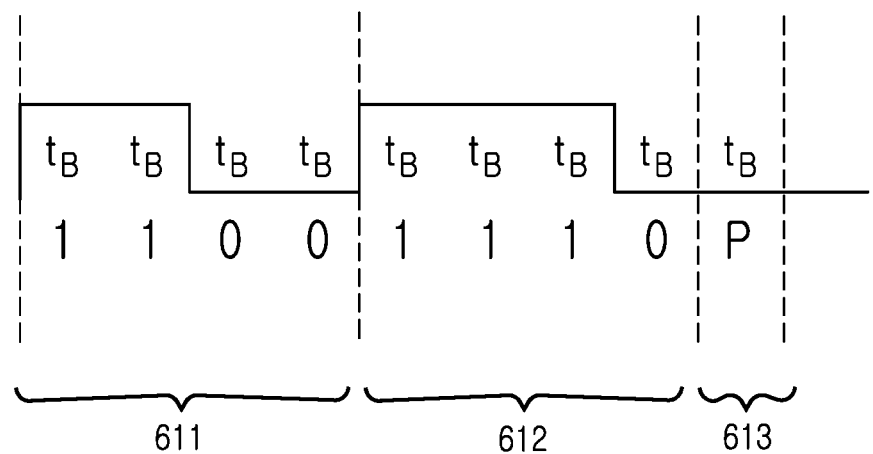

FIGS. 6A-B are diagrams illustrating an example of a data transmission process, according to aspects of the disclosure. Referring to FIG. 6A, a byte '10101010' 601 and 602 and a parity bit 603 may be delivered from the electronic device 100 to the charger 110 via the D− line. In some implementations, the four most significant bits (MSB) 601 of the byte may represent a current level. The four least significant bits (LSB) 602 of the byte may represent a voltage level. Bit 603 may be a parity bit. FIG. 6B depicts another example of a byte used to specify voltage and current levels for a charging signal. As illustrated, the byte includes MSB 611, LSB 612, and is followed by a parity bit 613.

Tables 1 and 2 below, illustrate an example of a mapping between different byte values and corresponding voltage/current levels. A data structure representing at least one of tables 1 and 2 may be stored in a memory of the charging device. In some implementations, the charging device may use the data structure to determine whether a requested voltage and/or current level is supported by the charging device.

TABLE 1

| Voltage Level | MSB(Most Signification Four Bits) | hex |
|---|---|---|
| 5 | 0000 | 0 |
| 6 | 0001 | 1 |
| 7 | 0010 | 2 |
| 8 | 0011 | 3 |
| 9 | 0100 | 4 |
| 10 | 0101 | 5 |
| 11 | 0110 | 6 |
| 12 | 0111 | 7 |
| 13 | 1000 | 8 |
| 14 | 1001 | 9 |
| 15 | 1010 | A |
| 16 | 1011 | B |
| 17 | 1100 | C |
| 18 | 1101 | D |
| 19 | 1110 | E |
| 20 | 1111 | F |

TABLE 2

| Current Level | LSB(Least Significant Four Bits) | hex |
|---|---|---|
| 0.75 | 0000 | 0 |
| 0.90 | 0001 | 1 |
| 1.05 | 0010 | 2 |
| 1.20 | 0011 | 3 |
| 1.35 | 0100 | 4 |
| 1.50 | 0101 | 5 |
| 1.65 | 0110 | 6 |
| 1.80 | 0111 | 7 |
| 1.95 | 1000 | 8 |
| 2.10 | 1001 | 9 |
| 2.25 | 1010 | A |
| 2.40 | 1011 | B |
| 2.55 | 1100 | C |
| 2.70 | 1011 | D |
| 2.85 | 1101 | E |
| 3.00 | 1111 | F |

Figure 7:
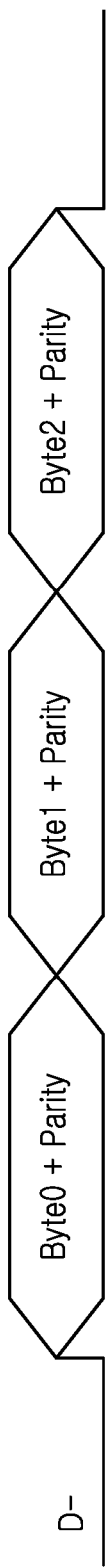
FIG. 7 is a diagram illustrating an example of a data transmission process, according to aspects of the disclosure.

FIG. 7 is a diagram illustrating an example of a data transmission process, according to aspects of the disclosure. Referring to FIG. 7, every data transmission consisting of one or more bytes is divided may include transmitting a parity bit for each of the bytes and a synchronization pulse.

Figure 8:
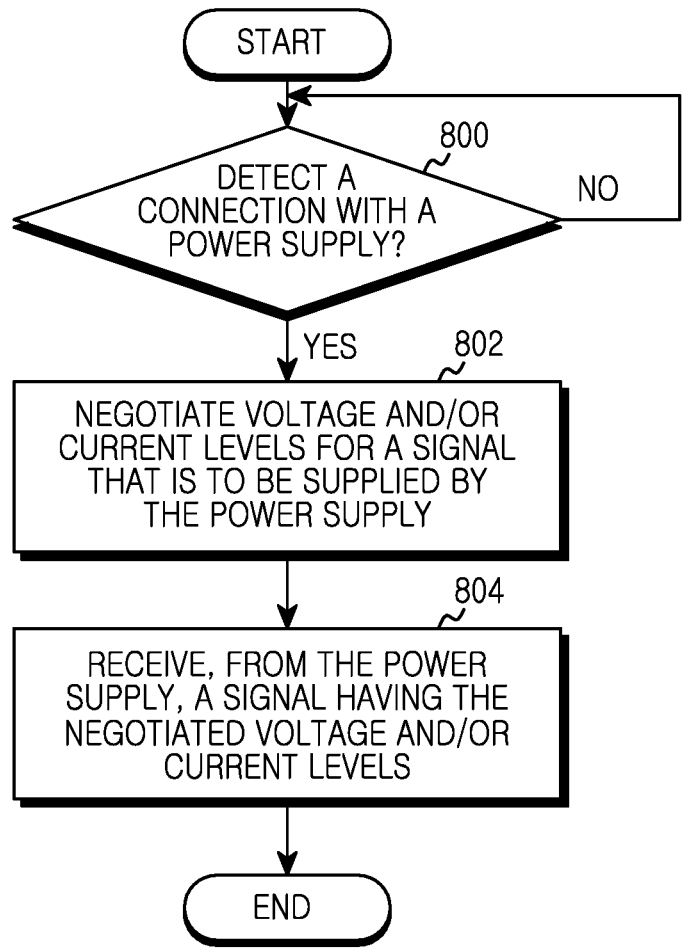
FIG. 8 is a flowchart of a process, according to aspects of the disclosure.

FIG. 8 is a flowchart of a process, according to aspects of the disclosure. In step 800, the electronic device may detect whether a power supply (e.g., charger 110 or computer 120) is connected to the electronic device. In step 802, if the power supply is connected, the electronic device may negotiate with the power supply the current and/or voltage levels of a power signal that is to be supplied by the power supply to the electronic device. If the power supplier is connected, in a state where the switches Sm1 361 to Sm3 363 are open, the switch Sm1 361 may maintain a close state, the switches Sm2 362 and Sm3 363 may maintain an open state, and a voltage $V_{DP\_SRC}$ (e.g., 0.6V) may be supplied to the $V_{BUS}$ node 330.

In step 804, the power supply may start feeding the negotiated power signal to the electronic device.

Figure 9:
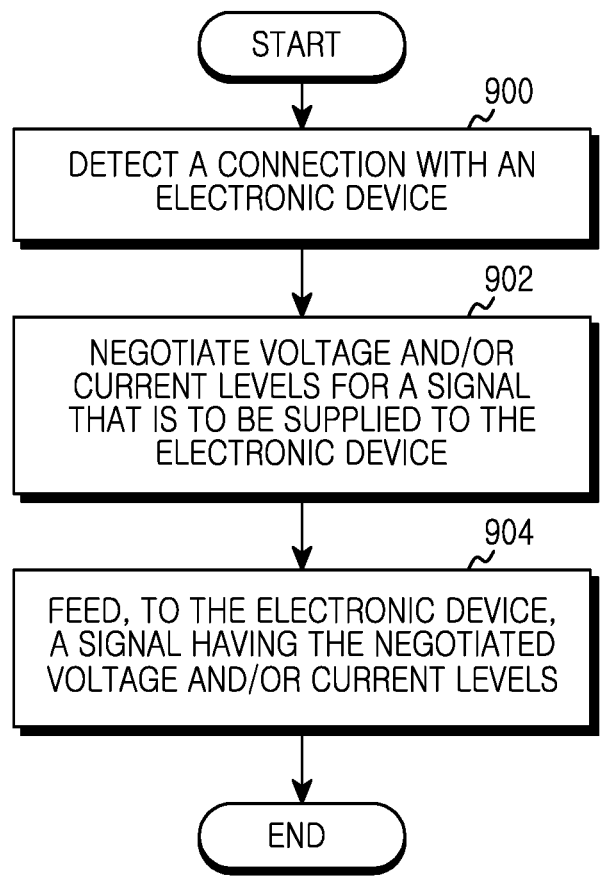
FIG. 9 is a flowchart of a process, according to aspects of the disclosure.

FIG. 9 is a flowchart of a process, according to aspects of the disclosure. In step 900, a power supply detects whether the power supply is connected to an electronic device. The connection with the electronic device may be detected based on a change in the state of the D+ line 343. For example, a specific voltage may be placed on the D+ node 343 when the electronic device and the power supply are connected. In step 902, the power supply may negotiate with the electronic device the voltage and/or current levels of a power signal that is to be provided to the electronic device. In step 904, the power supply may begin feeding a power signal to the electronic device. The power signal may have the voltage and/or current levels that were negotiated at step 902.

Additionally, in some implementation, the electronic device may detect whether it has become disconnected from the power supply according to the state of the $V_{BUS}$ 341. Optionally, the electronic device may detect a presence/absence of 60 kΩ of the Sa2 323 between pings during a ping interval (i.e., $t_{PING}$). The power supplier may determine whether the cable is separated according to a presence/absence of HIGH of $V_{DP-SRC}$ or D+. Optionally, the power supplier may detect a presence/absence of a master ping of the electronic device.

Figure 10:
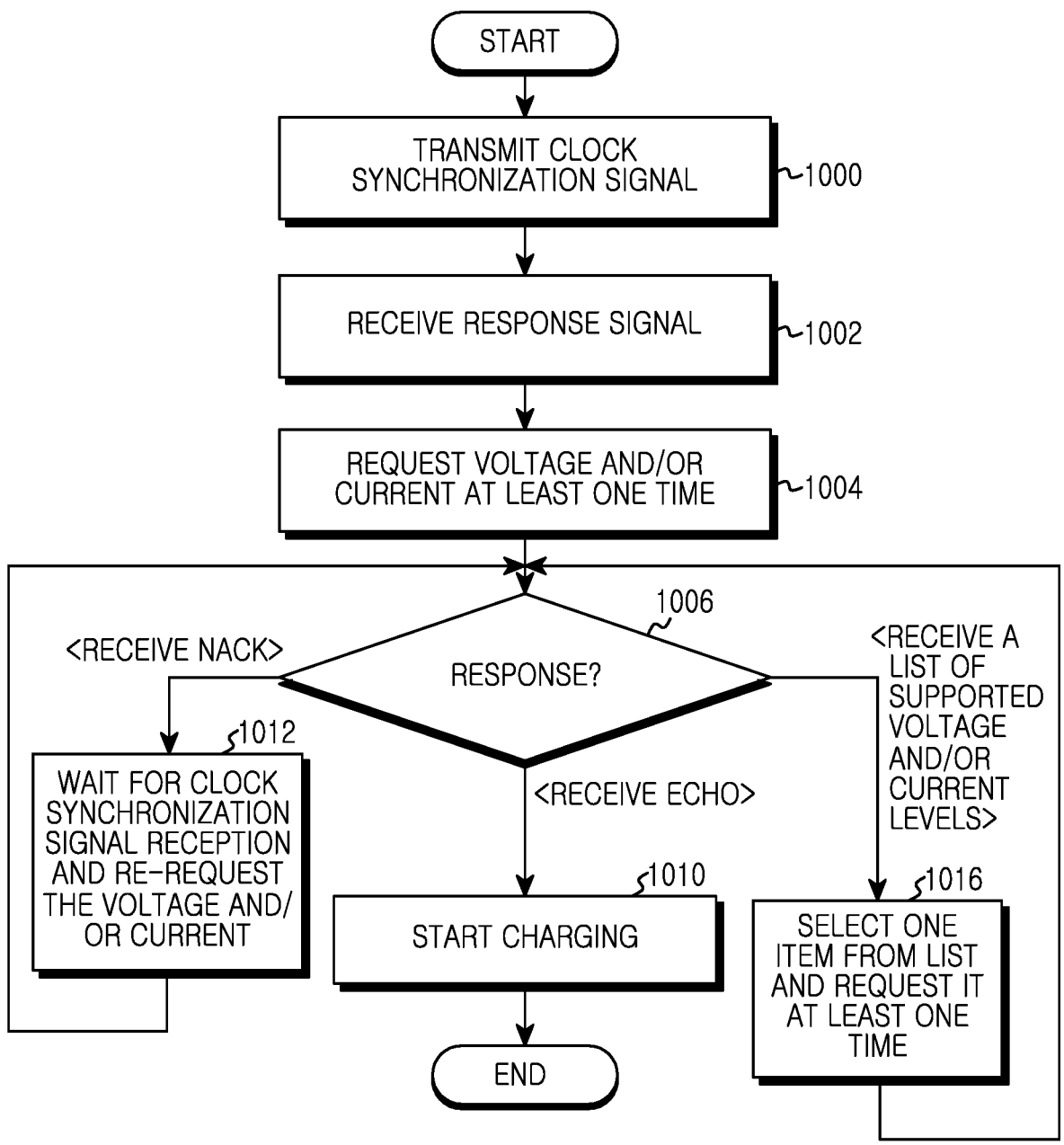
FIG. 10 is a flowchart of a process, according to aspects of the disclosure.

FIG. 10 is a flowchart of a process, according to aspects of the disclosure. In step 1002, the electronic device may transmit to a power supply (e.g., a battery charger) a clock synchronization signal (e.g., master ping pulses) to start quick charge communication. In step 1002, the electronic device may receive from the power a response signal (e.g., slave ping pulses) (see FIG. 5). In step 1004, the electronic device may transmit to the power supply an indication of at least one of (i) a desired voltage level and (ii) a desired current level (see FIG. 6). For example, the electronic device may transmit to the power supply a byte in which the four most significant bits specify the desired current level and the four least significant bits specify the desired voltage level (see Table 1 and Table 2 above).

In operation 1006, the electronic device determines a type of response that is received in response to the indication transmitted at operation 1004.

In step 1008, if it is determined in step 1006 that an acknowledgment is received the electronic device may start charging its battery using a power signal supplied by the power supply. As discussed above, the supplied signal may have the desired current and/or voltage levels specified in operation 1004. Thus, in some implementations, receiving the acknowledgment may indicate that the power supply supports the requested voltage and/or current levels. Additionally or alternatively, in some implementations, the acknowledgment may include a slave ping followed by an echo of the request transmitted in step 1004.

Additionally or alternatively, in some implementations, the power supply may wait to receive the same voltage and/or current level request 3 consecutive times before outputting the requested signal. This may be to prevent the power supply from outputting a signal having too high voltage and/or current levels as a result of an unexpected double parity or another type of bit error.

In step 1012, if it is determined in step 1006 that a Not Acknowledge nack (NACK) is received, the electronic device may re-attempt the voltage-current request in step 1012. The NACK may be transmitted by the power supply, when a parity error occurs. The NACK may include a slave ping that is not followed by an echo of the request transmitted in step 1004.

When the requested voltage and/or current levels are not supported, the electronic device may receive from the power supply at least one of (i) a first indication of voltage levels that are supported by the power supply and (ii) a second indication of current levels that are supported by the power supply. In some implementations, the first indication may include some (or all of the mappings identified in Table 1 (e.g., the first two columns of Table 1). In some implementations, the first indication and/or the second indication may form a voltage-current list. In some implementations, the voltage-current list may be performed through multi-data transmission as shown in FIG. 7.

In step 1016, the electronic device may select a voltage and/or current level that is identified as being supported by the terminal. The selection may be made based on at least one of the first indication of the voltage levels that are supported by the power supply and the second indication of the current levels that are supported by the power supply. Next, the electronic device may transmit to the power supply an indication of at least one of the selected voltage level and the selected current level. Finally, as discussed above, the power supply may begin feeding to the electronic device a signal having the voltage and/or current levels identified at step 1016.

More specifically, in some implementations, the electronic device may receive from the power supply a list of supported voltage levels and/or supported current levels. Each supported voltage level may be associated with a corresponding code. Each supported current level may also be associated with a corresponding code (e.g., see Table 1 and Table 2). Next, the electronic device may select one of the supported voltage levels and/or one of the supported voltage level. Next, the electronic device may extract the code(s) corresponding to the selected voltage level and/or supported current level. Next, the electronic device may insert the code(s) into a request for a power signal and transmit the power signal to the power supply. Although in this example, the list identifies the supported voltage level and the supported current levels independently from one another, in some implementations, the list may identify various pairs, wherein each pair includes a supported voltage level and a supported current level (e.g., [V]-2.5[A], 9[V]-1.67[A], and 12[V]-1.25[A]).

For example, the electronic device may desire to charge a battery with 14V/1.5 A. Accordingly, the electronic device may transmit a request containing the byte '10010101' (i.e. a hexadecimal of 95). If the power supply supports only 12V/1.2 and 5V/3 A, upon receiving '10010101' (i.e., a hexadecimal of 95) from the electronic device, the power supply may send 'h0F(hex)' and 'h73(hex)' in response thereto. The electronic device may recognize that a request thereof is not supported, and may send a value 'h73(hex)' three consecutive times. Likewise, the power supply may transmit 'h73(hex)' three times as an echo, and may modify a voltage after the $3^{rd}$ transmission.

Figure 11:
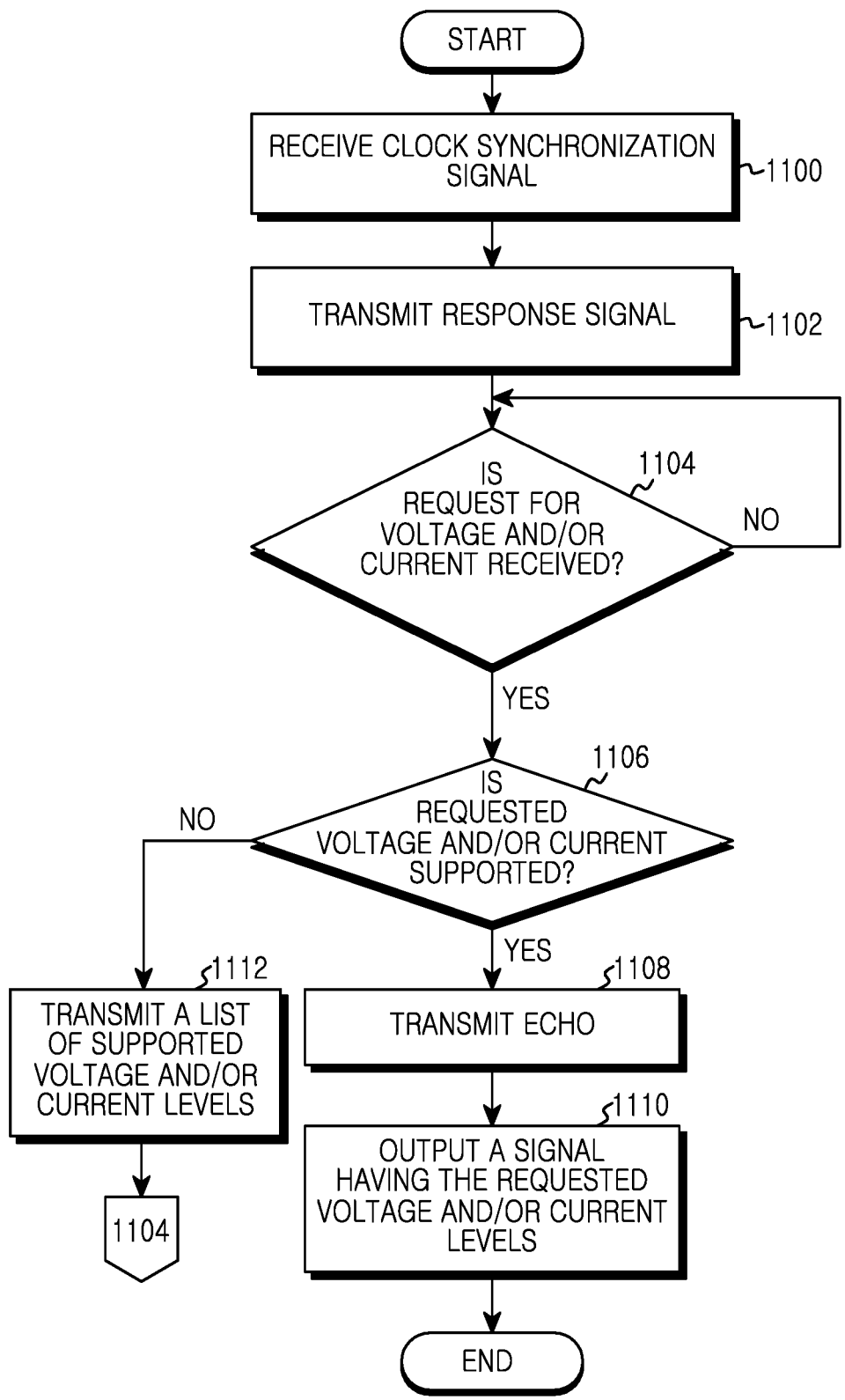
FIG. 11 is a flowchart of a process, according to aspects of the disclosure.

FIG. 11 is a flowchart of a process according to aspects of the disclosure. In step 1100, a power supply may receive, from an electronic device, a clock synchronization signal (e.g., master ping pulses). In operation 1102, the power supply may transmit, to the electronic device, a response to the clock synchronization signal (e.g., slave ping pulses) (see FIG. 5) in step 1102. In step 1104, the power supply may determine whether a request for a desired voltage and/or current level is received from the electronic device. In step 1106, the electronic device may determine whether the requested voltage and/or current level is supported by the electronic device. In operation 1108, if the power supply is capable of providing the requested voltage and/or current level, the power supply may transmit an echo of the request back to the electronic device. Afterwards, in operation 1110, the power supply may begin feeding to the electronic device a signal having the requested voltage and/or power levels.

Otherwise, if it is determined in step 1106 that the power supply is unable to provide the requested voltage and/or current levels, the process proceeds to step 1112. In step 1112, the power supply may transmit to the electronic device at least one of at least one of (i) a first indication of voltage levels that are supported by the power supply and (ii) a second indication of current levels that are supported by the power supply. In some implementations, the first indication may include some (or all of the mappings identified in Table 1 (e.g., the first two columns of Table 1). In some implementations, the first indication and/or the second indication may form a voltage-current list. Additionally or alternatively, in some implementations the list may identify a plurality of pairs, wherein each pair includes a supported voltage level and a supported current level (e.g., [V]-2.5[A], 9[V]-1.67[A], and 12[V]-1.25[A]).

FIGS. 1-11 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

As used throughout the disclosure, the term battery charger may refer to any suitable device capable of charging a battery, including, but not limited to, a travel adapter, a laptop, and/or another device having a particular interface over which data and/or power can be transmitted (e.g., a USB interface). As used throughout the disclosure, the term "processing circuitry" may refer to a processor, an interface controller (e.g., a USB controller), and or any other type of (integrated) circuit that may be part of the electronic device. Additionally or alternatively, as used throughout the disclosure, the term "processing circuitry" may refer to any combination of two or more of: (i) the processor, (ii) the interface controller (e.g., a USB controller), and (iii) any other type of (integrated) circuit that may be part of the electronic device.

Embodiments of the disclosure include a charging method of an electronic device. The method comprises confirming whether a power supplier is connected, if the power supplier is connected, negotiating a voltage-current pair corresponding to a rated power by using a quick charge interface, and starting charging by using the negotiated voltage-current pair. The method may further comprise if the requested voltage-current is not supported, receiving a list for a possible voltage-current pair, selecting one voltage-current pair from the list, and requesting the selected voltage-current pair at least one time. The method may further comprise if the echo is received for the at least one request, determining the requested voltage-current pair as the voltage-current for the charge, and if the echo is not received for the at least one request, re-requesting the voltage-current pair for the quick charge at least one time during a clock synchronization period.

Here, The negotiating of the voltage-current pair corresponding to the rated power by using the quick charge interface comprises transmitting a clock synchronization signal, receiving a response signal for the clock synchronization signal, requesting the voltage-current pair for a quick charge at least one time, after the clock synchronization; and if an echo is received in response to the at least one request, determining the requested voltage-current pair as a voltage-current for the charging. If the echo is not received in response to the at least one request, re-requesting the voltage-current pair for the quick charge at least one time during a clock synchronization period.

Embodiments of the disclosure include a charging apparatus of a power supplier. The apparatus comprising a USB controller is configured for detecting whether an electronic device is inserted, if the electronic device is inserted, negotiating a voltage-current pair corresponding to a rated power by using a quick charge interface, and supplying the negotiated voltage-current pair to the electronic device. The USB controller is configured for receiving a clock synchronization signal, transmitting a response signal for the clock synchronization signal, receiving the voltage-current pair for a quick charge at least one time, after the clock synchronization, and if a parity error exists as to the at least one request, receiving a re-request for the voltage-current pair for the quick charge at least one time during a clock synchronization period. The USB controller is configured for, if the parity error does not exist as to the at least one request, confirming whether the request voltage-current can be supported, and if the requested voltage-current pair can be supported, transmitting an echo as to the requested voltage-current pair at least one time. The USB controller is configured for, if the request voltage-current cannot be supported, transmitting a list for a possible voltage-current pair. The function of the quick charge interface is performed on the basis of a USB port.

The above-described aspects of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. A method in an electronic device, comprising:
   detecting a connection with a battery charger;
   transmitting to the battery charger a first request for at least one of a first voltage level and a first current level;
   receiving from the battery charger a signal, wherein the signal is either an echo of the first request, a list of supported signal characteristics, or NACK (Not Acknowledge);
   based on that the signal comprises the echo of the first request, charging a battery of the electronic device in response to the signal; and
   based on that the signal comprises the list of the supported signal characteristics, transmitting, to the battery charger, a second request for at least one of a second voltage level or a second current level based on the list.

2. The method of claim 1, wherein the signal is a list of supported signal characteristics identifying at least one of (i) a first plurality of voltage levels that the battery charger is capable of providing and (ii) a second plurality of current levels that the battery charger is capable of providing; generating, based on the list, the second request for at least one of the second voltage level and the second current level.

3. The method of claim 2, wherein generating the second request includes retrieving from the list a code corresponding to the second voltage level and inserting the code into the second request.

4. The method of claim 2, wherein generating the second request includes retrieving from the list a code corresponding to the second current level and inserting the code into the second request.

5. The method of claim 1 wherein the signal is NACK, further comprising re-transmitting to the battery charger the second request for at least one of the second voltage level and the second current level.

6. A method in a battery charger, comprising:
   detecting a connection with an electronic device;
   receiving from the electronic device a first request for one of a first voltage level and a first current level;
   detecting whether the battery charger is capable of outputting a signal having one of the first voltage level and the first current level;
   in response to detecting that the battery charger is capable of outputting the signal having one of the first voltage level or the first current level, outputting one of the first voltage level and the first current level to the electronic device; and
   in response to detecting the battery charger is not capable of outputting the signal having one of the first voltage level or the first current level, transmitting a signal comprising a list of supported signal characteristics.

7. The method of claim 6, wherein the first request includes a first voltage level further comprising:
   extracting, from the first request, a code corresponding to the first voltage level; and
   comparing the code against a data structure identifying a plurality of voltage levels that are supported by the battery charger, wherein the data structure is stored in a memory of the battery charger.

8. The method of claim 6, wherein the list includes a first plurality of signal characteristic identifiers and a second plurality of codes corresponding to the first plurality of signal characteristic identifiers, wherein each one of the first plurality of signal characteristic identifiers is mapped to a different one of the second plurality of codes.

9. An electronic device comprising a processing circuitry configured to:
   detect a connection with a battery charger;
   transmit to the battery charger a first request for at least one of a first voltage level and a first current level;
   receive from the battery charger a signal, wherein the signal is either an echo of the first request, a list of supported signal characteristics, or NACK (Not Acknowledge);
   based on that the signal comprises the echo of the first request, charge a battery in response to the signal; and
   based on that the signal comprises the list of the supported signal characteristics, transmit to the battery charger a second request for at least one of a second voltage level or a second current level based on the list.

10. The electronic device of claim 9 wherein the processing circuitry is configured to:
    receive the list of supported signal characteristics, the list identifying at least one of (i) a first plurality of voltage levels that the battery charger is capable of providing and (ii) a second plurality of current levels that the battery charger is capable of providing; and
    generate, based on the list of supported signal characteristics, the second request for at least one of the second voltage level and the second current level.

11. The electronic device of claim 10, wherein generating the second request includes retrieving from the list a code corresponding to the second voltage level and inserting the code into the second request.

12. The electronic device of claim 10, wherein generating the second request includes retrieving from the list a code corresponding to the second current level and inserting the code into the second request.

13. The electronic device of claim 9 wherein the signal is NACK, the processing circuitry is further configured to re-transmitting to the battery charger the second request for at least one of the second voltage level and the second current level.

14. A battery charger comprising processing circuitry configured to:
    detect a connection with an electronic device;
    receive from the electronic device a first request for a first signal characteristic;
    detect whether the battery charger is capable of outputting a signal having the first signal characteristic;
    in response to detecting that the battery charger is capable of outputting the signal having the first signal characteristic, output the signal to the electronic device; and
    in response to detecting that the battery charger in not capable of outputting the signal having the first signal characteristic, transmit to the electronic device a signal comprising a list of signal characteristics that are supported by the battery charger.

15. The battery charger of claim 14, wherein the first signal characteristic includes a specified voltage level and detecting whether the battery charger is capable of outputting the signal having the first signal characteristic includes:
    extracting, from the first request, a code corresponding to the specified voltage level; and
    comparing the code against a data structure identifying a plurality of voltage levels that are supported by the battery charger,
    wherein the data structure is stored in a memory of the battery charger.

16. The battery charger of claim 14, wherein the list includes a first plurality of signal characteristic identifiers and a second plurality of codes corresponding to the first plurality of signal characteristic identifiers, wherein each one of the first plurality of signal characteristic identifiers is mapped to a different one of the second plurality of codes.

17. A method in a charged electronic device, comprising:
    detecting a connection with a battery charger by the charged electronic device;
    responsive to detecting the connection by the charged electronic device to the battery charger, transmitting, by the charged electronic device to the battery charger, a first request to receive power having a desired voltage level or a desired current level;
    receiving, by the charged electronic device, from the battery charger a signal, wherein the signal is either an echo of the first request, a list of supported signal characteristics, or NACK (Not Acknowledge); and
    charging a battery of the charged electronic device in response to the signal,
    wherein the first request is transmitted before receiving power from the battery charger.

18. The method of claim 17, wherein when the signal from the battery charger is the echo, determining by the charged electronic device that the battery charger can provide power having the desired voltage level or the desired current level.

19. The method of claim 17, wherein when the signal from the battery charger is the NACK, retransmitting by the charged electronic device, the first request to receive the power having the desired voltage level or the desired current level.

20. The method of claim 17, wherein when the signal from the battery charger is the list of supported signal characteristics, determining, by the charged electronic device, that the battery charger cannot provide power having the desired voltage level or the desired current level.

* * * * *